US009917929B2

(12) United States Patent
Abel et al.

(10) Patent No.: US 9,917,929 B2
(45) Date of Patent: *Mar. 13, 2018

(54) STICKY AND TRANSIENT MARKERS FOR A PACKET PARSER

(71) Applicant: International Business Machines Corporation, Armonk, NY (US)

(72) Inventors: Francois Abel, Rueschlikon (CH); Claude Basso, Nice (FR); Philippe Damon, Chapel Hill, NC (US); Fabrice J. Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 64 days.

This patent is subject to a terminal disclaimer.

(21) Appl. No.: 14/932,244

(22) Filed: Nov. 4, 2015

(65) Prior Publication Data

US 2016/0134549 A1    May 12, 2016

(30) Foreign Application Priority Data

Nov. 7, 2014   (GB) .................................. 1419824.6

(51) Int. Cl.
| | | |
|---|---|---|
| *H04L 12/28* | (2006.01) | |
| *H04L 29/06* | (2006.01) | |
| *H04L 12/851* | (2013.01) | |
| *H04L 12/741* | (2013.01) | |

(52) U.S. Cl.
CPC .............. *H04L 69/22* (2013.01); *H04L 45/74* (2013.01); *H04L 47/2441* (2013.01)

(58) Field of Classification Search
CPC ..... H04L 12/28; H04L 47/2441; H04L 12/56; H04L 45/74
See application file for complete search history.

(56) References Cited

U.S. PATENT DOCUMENTS

| | | |
|---|---|---|
| 7,464,254 B2 | 12/2008 | Sharangpani et al. |
| 8,219,713 B2 | 7/2012 | Shah et al. |
| 8,576,864 B2 | 11/2013 | Basso et al. |
| 8,631,483 B2 | 1/2014 | Soni et al. |
| 2004/0039940 A1 | 2/2004 | Cox et al. |
| 2004/0258043 A1 | 12/2004 | Engebersen et al. |

(Continued)

FOREIGN PATENT DOCUMENTS

GB        2502455 A        11/2013

OTHER PUBLICATIONS

Abel et al., "Sticky and Transient Markers for a Packet Parser," U.S. Appl. No. 15/049,256, filed Feb. 22, 2016.

(Continued)

*Primary Examiner* — Andrew Lee
(74) *Attorney, Agent, or Firm* — Robert J. Shatto

(57) ABSTRACT

A packet parser has a set of marker elements each comprising a one bit latch and connected to store flag values from the results of the application of parser rules. Some marker elements are connected to provide the stored marker values as input to the parser rule logic to be taken into account in the processing of subsequent parser rules and some are connected to control external hardware. Some markers are reset at the end of each packet. A special toggle marker element toggles its value when its address is selected and other marker elements are connected to store, when its own address is selected, the value of the toggle element. Other markers toggle their own value when selected.

13 Claims, 3 Drawing Sheets

(56) References Cited

U.S. PATENT DOCUMENTS

| | | | |
|---|---|---|---|
| 2011/0310901 A1* | 12/2011 | Uchida | H04L 43/026 370/392 |
| 2012/0054365 A1* | 3/2012 | Wu | H04L 45/302 709/238 |
| 2012/0134360 A1* | 5/2012 | Du | H04L 43/028 370/392 |
| 2012/0159132 A1 | 6/2012 | Abel et al. | |
| 2012/0166686 A1* | 6/2012 | Hartung | G06F 13/24 710/48 |
| 2012/0195208 A1 | 8/2012 | Abel et al. | |
| 2012/0300642 A1 | 11/2012 | Abel et al. | |
| 2013/0010803 A1* | 1/2013 | Yamaguchi | H04L 45/74 370/408 |
| 2013/0259044 A1* | 10/2013 | Tanabe | H04L 45/38 370/390 |
| 2015/0128212 A1* | 5/2015 | Scott | H04L 41/0893 726/1 |
| 2015/0163197 A1* | 6/2015 | Pratapa | H04L 61/255 709/245 |
| 2016/0006684 A1* | 1/2016 | Akiyoshi | H04L 61/103 709/245 |

OTHER PUBLICATIONS

List of IBM Patents or Patent Applications Treated as Related, signed Feb. 18, 2016, 2 pgs.

Van Lunteren et al., "Hardware-Accelerated Regular Expression Matching at Multiple Tens of Gb/s", 2012 Proceedings IEEE INFOCOM, Copyright 2012 IEEE, pp. 1737-1745, DOI: 10.1109/INFCOM.2012.6195546.

GB Application 1419824.6, entitled "Sticky and Transient Markers for a Packet Parser", filed Nov. 7, 2014, 16 pages.

Foreign Search Report, Application No. GB1419824.6, 4 pgs., dated Apr. 20, 2016.

IBM, "Enhanced Default Rule Handling for a Programmable State Machine," An IP.com Prior Art Database Technical Disclosure, Original Publication Date: May 23, 2007, IP.com No. IPCOM000153071D, IP.com Electronic Publication Date: May 23, 2007, 5 pgs.

van Lunteren et al., "XML Accelerator Engine," First International Workshop on High Performance XML Processing, Satellite workshop of WWW2014 International conference 2004, http://wam/inrialpes.fr/www-workshop2004/ZuXA_final_paper.pdf., pp. 1-6.

* cited by examiner

STICKY AND TRANSIENT MARKERS FOR A PACKET PARSER

CROSS REFERENCE TO RELATED APPLICATION

This application claims priority to United Kingdom Patent Application No. 1419824.6, filed Nov. 7, 2014, which is incorporated herein in its entirety.

BACKGROUND

The present invention relates to flags to be used in a packet parser.

In data networks, devices such as routers and network switches need to be able to process and forward large numbers of data packets with little delay. To meet those demands, network processors have been developed that are specialized for the task compared to general purpose processors and therefore can operate a much higher speeds.

SUMMARY

Embodiments of the present disclosure include a packet parser and a packet processor. In embodiments, a packet parser may include a rule processor and a plurality of marker elements. The rule processor may be configured to apply parsing rules to data in a data packet. The rule processor may then generate a result address value that indicates the outcome of an application of a parsing rule to the data in the data packet. Each marker element of the plurality of marker elements may include a one-bit store. The plurality of marker elements may be configured to update a selected marker element with a value. The selected marker element may be one of the plurality of marker elements. The selected marker element may be based on the result address value generated by the rule processor. In some embodiments, the packet parser may be part of a packet processor.

Additional embodiments of the present disclosure include a method for storing parsing results. A result address value that indicates an outcome of an application of a parsing rule to data may be generated. A selected marker element may be determined based on the result address value. The selected marker element may be one of a plurality of marker elements. Each marker element of the plurality of marker elements may include a one-bit store. The value of the selected marker element may be updated to a new value. The new value may be based on the value of one of the marker elements of the plurality of marker elements.

The above summary is not intended to describe each illustrated embodiment or every implementation of the present disclosure.

BRIEF DESCRIPTION OF THE DRAWINGS

Embodiments of the present invention will now be described, by way of example only, with reference to the following drawings in which.

Figure 1:
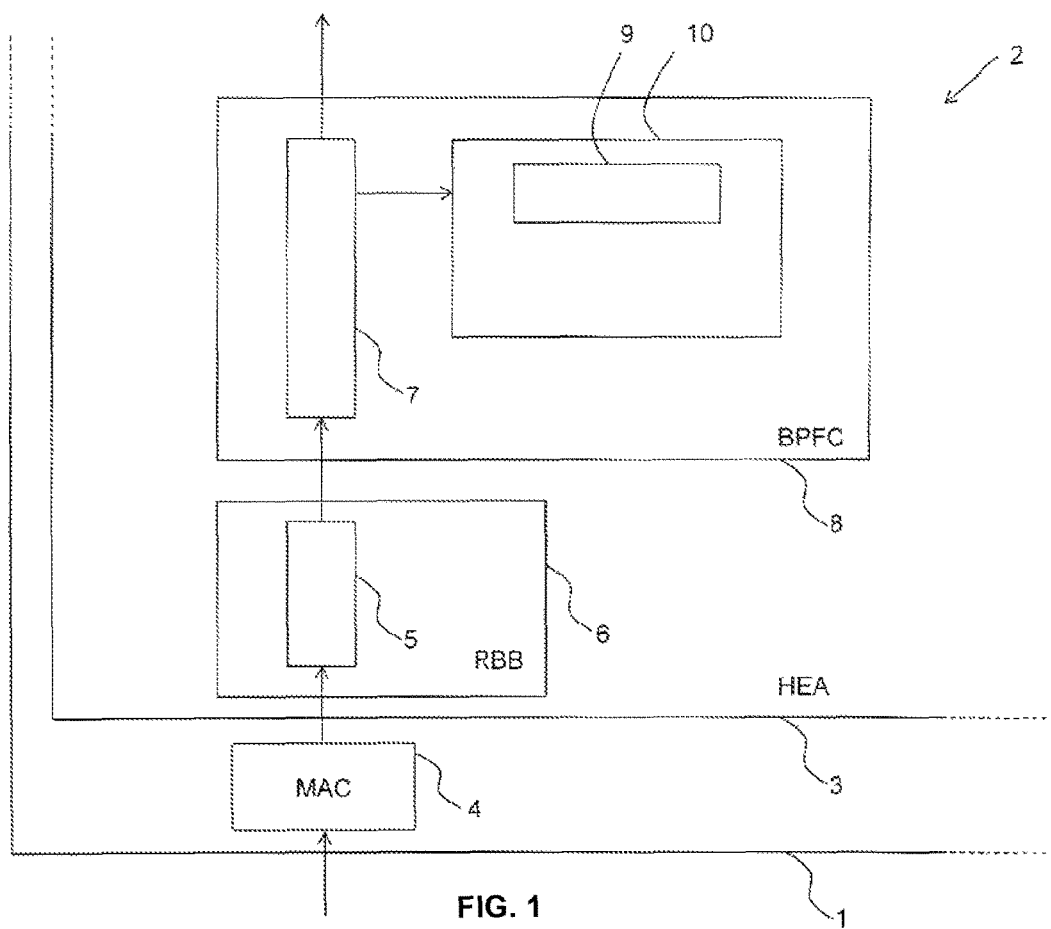
FIG. 1 is a block diagram of part of a network processor, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

In accordance with embodiments of the invention, there is provided a packet parser comprising:

a rule processor connected to apply parsing rules to data from a data packet and to supply a result address value indicating an outcome of the application of a parsing rule to data from a data packet; and a plurality of marker elements, each marker element comprising a one-bit store, the plurality of marker elements being connected to update a selected one of the marker elements, selected in response to the address value, with a value based on a value in one of the marker elements of the plurality.

The marker elements may be connected, for at least one of marker elements, to update the selected one to a new value based on the previous value of the selected marker.

The plurality of marker elements may comprise a special marker element, that comprises a one bit store, and the marker elements may be connected, for at least one of the marker elements, to update the selected one to a new value based the value of the special marker element. The special marker element may be connected to invert its value when enabled and to supply its stored value, or a value based thereon, to the input of the selected marker.

The rule processor may be connected to extract the marker element address value from a field of a processor rule.

One or more of the outputs of the marker elements may be connected to the rule processor, the rule processor being connected to be responsive thereto in the processing of a parser rule.

One or more of the outputs of the marker elements may be connected to hardware external to the packet parser the hardware being connected to respond to the output as a control signal.

The packet parser may be connected to provide a packet transition signal at the beginning or end of a packet and one or more of the marker elements may be connected to be responsive to that signal to reset to a default value.

The packet parser may comprise an address decoder connected to receive a result address from the rule processor and to generate one of a plurality of enable signals, respectively connected to the markers of the plurality of marker elements as an enable input.

A packet processor may include the said packet parser.

Embodiments of the present invention also provide a method of storing parsing results, the method comprising:

providing a plurality of marker elements, each marker element comprising a one-bit store;

applying a parsing rule to data and supplying a result address value indicating an outcome of the application of a parsing rule to the data;

selecting one of the plurality of marker elements in response to the result address value; and updating the selected marker element with a value based on a value of one of the marker elements of the plurality.

The updating may comprise, for at least one of the marker elements, updating the selected one to a new value based on the previous value of the selected marker.

The updating may comprise, for at least one of marker elements, updating the selected one to a new value different from a default value of that marker element.

The updating may comprise, for at least one of the marker elements, updating the selected one of the marker elements to a new value based on the value stored by a special marker element, the special marker element comprising a one-bit store. Further, the method may comprise inverting the stored value of the special marker element and supplying its stored value, or a value based thereon, to the input of the selected marker.

The method may comprise extracting the result address value from a field of the parsing rule.

The parsing rule may be applied by a rule processor, and the method may comprise applying the value stored in one or more of the marker elements to the rule processor, and the rule processor responding thereto in processing of a parser rule.

The parsing rule may be applied by a rule processor, and the method may comprise applying the value stored in one or more of the marker elements to hardware external to the rule processor, and the hardware responding thereto as a control signal.

The method may comprise providing a packet transition signal at the beginning or end of a data packet, and resetting one or more of the marker elements in response to that signal to a default value.

The method may comprise decoding the result address to set one of a plurality of enable signals, and respectively applying those to the markers elements of the plurality as an enable input.

Turning now to the figures, FIG. 1 shows a part 2 of a network processor 1 which handles the reception of a packet into the network processor. This part 2 of the network processor 1 comprises a host Ethernet adapter (HEA) 3 and an associated media access controller (MAC) 4. The MAC 4 receives data from its communication line and passes it to a receive backbone (RBB) unit 6. The RBB manages the movement of data from the MAC by converting, aligning, and storing them in a line buffer 5. Once stored, the RBB passes the packets along to a second buffer 7 forming part of a BPFC unit 8. "BPFC" means "BFSM-based parser filter and checksum" and "BFSM" means "BaRT-based finite state machine." The second buffer 7 is known in this case as the "data path."

The role of this BPFC unit 8 is to analyze the packets in the data path buffer 7 and take various actions, for example, checking a checksum of a packet transmitted with it, deciding on which of the packet queues (not shown), i.e., those for distributing packets to other ports of the switch, of the network processor 1 to allocate each packet, and classifying or discarding the packets. This is done with a parser 9.

The BPFC 8 has a rule processor 10 which receives data words from the data path buffer 7 and applies parsing rules to them. A parsing rule typically consists of a test part and a result part. The test part specifies, inter alia, values for comparing with the received data words and masks to be applied to match the current rule. The result part encodes, inter alia, a set of instructions and actions to be performed when the current rule is matched. This combination of comparisons and actions is used to make the decisions noted above. The rules are loaded from a local store and several may be loaded into the rule processor 10 to be processed in parallel.

Figure 2:
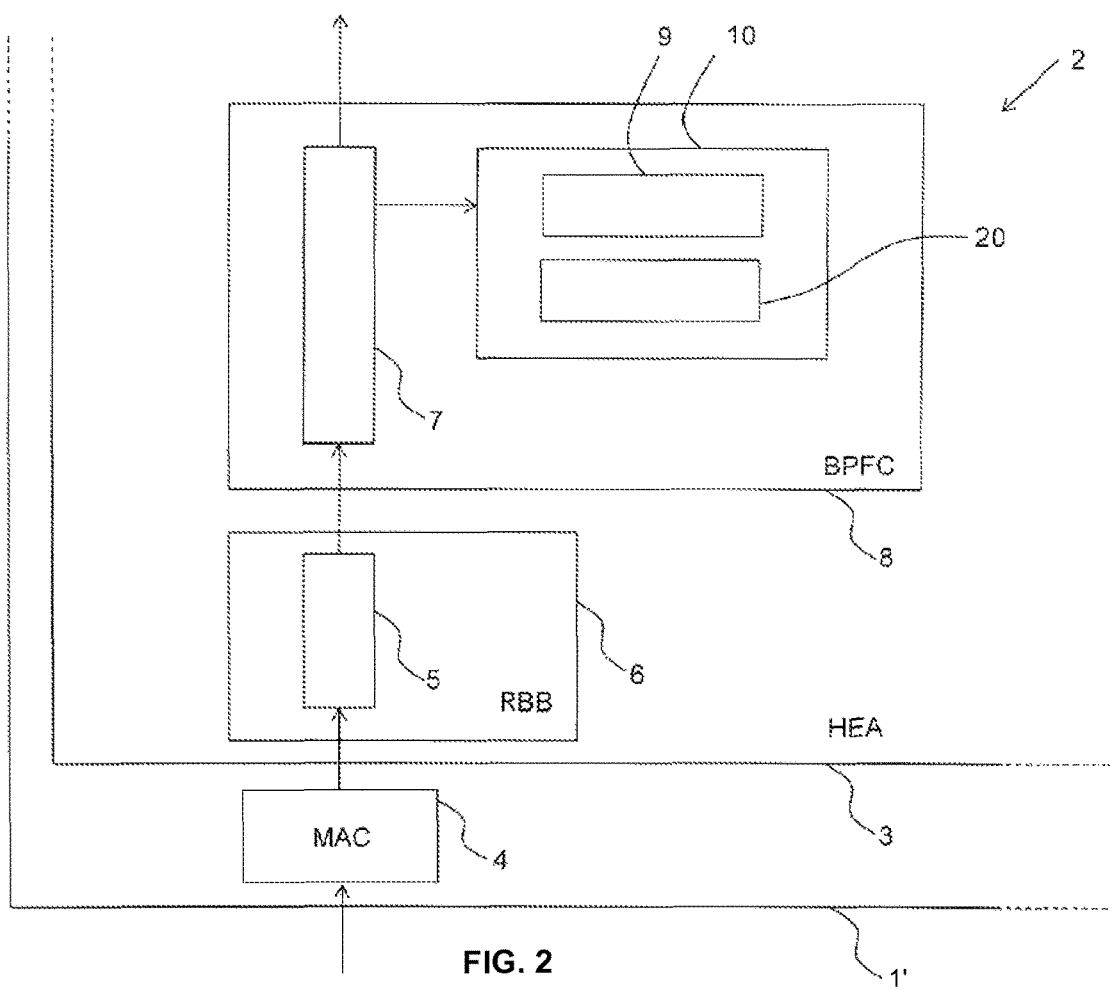
FIG. 2 is a block diagram of a similar part of a network processor, in accordance with embodiments of the present disclosure.

FIG. 2 is a block diagram of a part 2 of a network processor 1' according to the invention. In addition to having the units described in reference to FIG. 1 above, which have similar reference numerals, the processor 1' also has a marker unit 20 provided in the packet parser 9. The marker unit 20 is shown in more detail in FIG. 3, which will now be discussed.

The marker unit 20 has a set of marker elements 21, each of which comprises a one-bit store, for example a latch. Each latch is used to store a one-bit flag indicating some outcome or other of the application of one of the parser rules. Only one marker element 21 is selected at any one time to be written, by an address decoder 22, which is provided with an address word from the rule processor 10 to make the selection. Each marker element has a respective address value. In this example, there are 30 marker elements (not all shown in FIG. 3) and a 5-bit word from the rule processor is provided to the address decoder 22, which leaves two address word values, in this example binary values "00000" and "11111." For "00000" there is no respective marker element at all, and that value is used to indicate that no marker element is being selected. "11111" is the address for a special marker element 31, which is discussed later below. The address value is provided from a field of the result part of the rule being evaluated. So the parser rule code word not only specifies the particular test to be carried out on the packet data, but also where to store a result of that test, if indeed the result is to be stored.

The flag values stored in latches of the normal marker elements are available in parallel to the rest of the circuitry. These stored values output from markers may be applied to the parser to be available to be taken into account in the processing of subsequent rules. Also, they may be connected to other hardware, which is a way of having the results of the rule processing control that hardware. In this example, for simplicity, some of the markers are connected to the parser and the others are connected to the other hardware; i.e., those sets are mutually exclusive. However, it is possible to have one (or more) of the markers whose output is connected to both the parser and the other hardware. Additionally, there may be situations in which all the markers only output to the parser or in which all the markers only output to other hardware.

Examples of the other hardware to which the output of one or more of the markers may be connected are an interrupt controller, a finite state machine, a status register, and a control register.

As noted above, the marker elements are used to store results of parser rules. In general they keep their values until overwritten by the result of some subsequent rule or until cleared by a reset command or function. The marker elements come in two types, which are called here "sticky" and "transient," with the value of the transient ones persisting until the next packet transition (i.e., upon the detection of a packet boundary such as the start or end of a packet by the parser), while the sticky ones are not reset at those times.

In the example circuit, a "sticky" marker is further a marker whose value can be changed multiple times by being overwritten with the result of a parser rule. A "transient" marker element is a marker that can change its default initialization value ('0' or '1') once, as will be seen from the particular details of the circuit described below. Transient marker elements are a convenience, since many parser rules and the actions based on them apply only to a single packet, and, therefore, the corresponding marker elements can be reinitialized all together at a packet transition with their default value, rather than each having to be initialized programmatically with marker rules.

Figure 3:
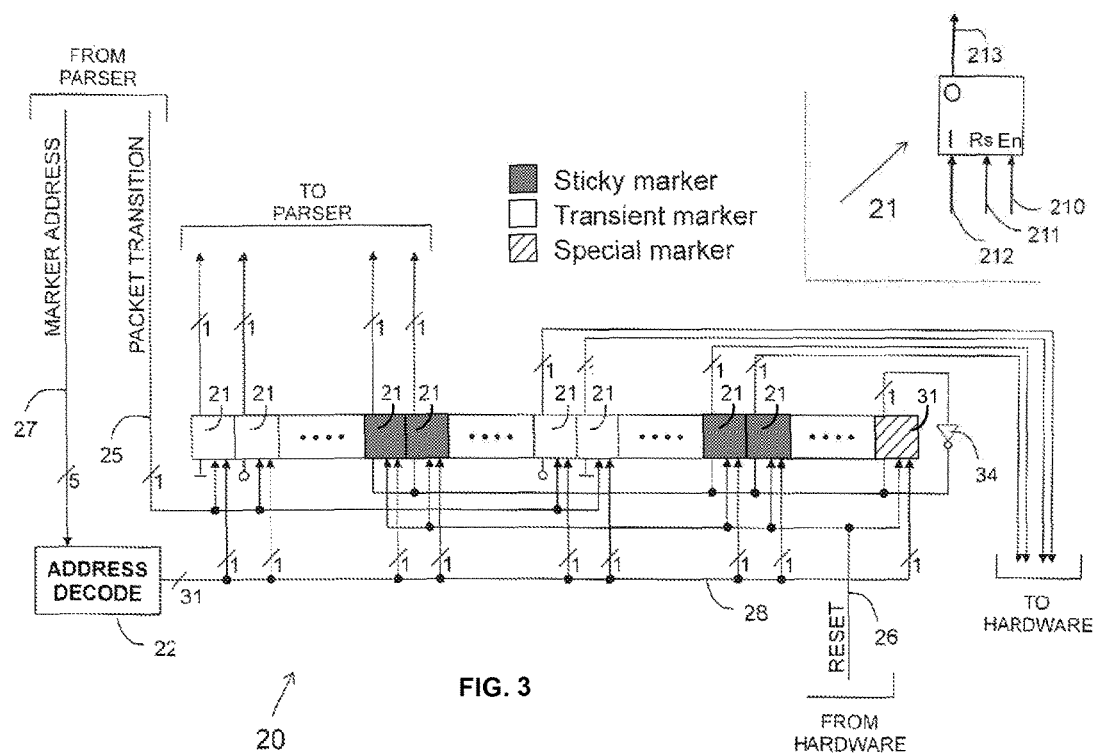
FIG. 3 is a block diagram of a marker unit, in accordance with embodiments of the present disclosure.

In the example circuit of FIG. 3, a packet transition signal on a conductor 25 is connected to a reset input 211 of each transient marker element. This signal is set active at the beginning or end of each packet, and each transient marker element responds to the signal being active by initializing its value to a '0' or a '1'. This initialization value may be the same for each transient marker, but the values may be different for different ones of the marker elements. The packet transition signal itself may be the result of an application of the parser rules. A similar conductor 26 is connected to the reset input of each sticky marker element to set the default initialization value of these type of elements. This signal is only activated once, typically during a hardware or software initialization phase.

The marker elements connected to the parser can be sticky or transient, and the latches connected to other hardware can be sticky or transient. Examples of each of those combinations are shown in the circuit of FIG. 3.

The main way the value of a marker element is written in the example circuit is that an address value discussed above is provided on a set of conductors 27 as the result of a parser rule. The address value is applied to decoder 22, which then provides an active signal on one of a set of conductors 28 each connected to the enable input 210 of a respective marker element 21. When the enable input 210 of a marker element is active, the value presented at the data input 212 is written into the marker element.

The value presented at the data input 212 can be assigned statically by design, such as depicted with the transient marker elements of FIG. 3. See the earth connection or positive connection (represented by a circle) connecting to the data inputs 212 of the transient marker elements 21. So for the transient markers in this example circuit, when the address signal causes the enable input 210 of a transient marker to be active, it latches the static value at the data input 212, changing the value from the initial value (which is set by design to be the opposite value). Hence, in this example circuit, the value of a transient markers cannot be changed once written by the parser, until it is reset for the next packet.

On the other hand, in this embodiment, the data input can be dynamically set by involving the special market element 31. This is also a one-bit store similar to other marker elements, but its stored value will toggle from "0" to "1" or "1" to "0" each time it is enabled by its address value being provided by the rule processor (i.e., the address "11111"). In the example circuit of FIG. 3, this is implemented by an inverter 34 being connected between its output 213 and its input, but it may be done in other ways. The inverted output of the special marker element 31 is also connected to the input 212 of each of the sticky marker elements 21 so that they take signal as input value to store when they are subsequently selected by the address supplied by the rule processor. In the example circuit, the special marker element 31 is only reset to a default value at power-on and not at transition of each packet, like the transient marker elements.

It is notable that the values written to the markers when their enable input 210 is active are not provided by outcome of the parser rules (which keeps their word length down), but rather arise inside the marker unit 20, either from the special marker element 31 or from a hard wired value.

Although not shown in the example circuit of FIG. 3, it would be possible to provide transient markers that can be written and rewritten using the special marker value, and a sticky marker that can only be set once until an infrequent reset (e.g., the hardware reset), but the latter of course may not find many uses.

In the example circuit of FIG. 3, the marker elements are clocked, i.e., they change state only at times defined by a clock signal (not shown).

The example circuit is for a packet parser in an HEA unit inspecting packets on the way from the MAC to the host. The invention however may be used in any packet parser.

Whilst the present invention has been described and illustrated with reference to particular embodiments, it will be appreciated by those of ordinary skill in the art that the invention lends itself to many different variations not specifically illustrated herein. The present invention may be a system and/or a method.

What is claimed is:

1. A packet parser comprising:
   a rule processor configured to apply parsing rules to data from a data packet and to supply a result address value indicating an outcome of an application of a parsing rule to data from the data packet; and
   a plurality of marker elements, each marker element comprising a one-bit store, the plurality of marker elements being configured to update a selected marker element with a value based on a value of one of the marker elements of the plurality of marker elements, the selected marker element being one of the plurality of marker elements, the selected marker element being selected based on the address value,
   wherein the plurality of marker elements comprises a special marker element, the special marker element comprising a one bit store, the special marker element being configured to invert its value when enabled and to supply its stored value to an input of the selected marker element, and
   wherein at least one of the plurality of marker elements is configured to update the selected marker element to a new value based on a value stored by the special marker element.

2. The packet parser of claim 1, wherein the new value is different from a default value of the selected marker element.

3. The packet parser of claim 1, wherein the rule processor is configured to extract the marker element address value from a field of a processor rule.

4. The packet parser of claim 1, wherein one or more outputs of the plurality of marker elements is connected to the rule processor, the rule processor being configured to process the parsing rule in response to the one or more outputs.

5. The packet parser of claim 1, wherein one or more outputs of the plurality of marker elements is connected to hardware external to the packet parser, the hardware being configured to respond to the one or more outputs as a control signal.

6. The packet parser of claim 1, wherein the packet parser is configured to provide a packet transition signal at a beginning or end of a packet, and wherein one or more of the plurality of marker elements is configured to reset to a default value based on the packet transition signal.

7. The packet parser of claim 1, the packet parser further comprising an address decoder configured to receive the result address value from the rule processor and to generate one of a plurality of enable signals, each of the plurality of enable signals being connected to a marker element as an enable input.

8. A packet processor comprising:
   a packet parser including:
      a rule processor configured to apply parsing rules to data from a data packet and to supply a result address value indicating an outcome of an application of a parsing rule to data from the data packet; and a plurality of marker elements, each marker element comprising a one-bit store, the plurality of marker elements being configured to update a selected marker element with a value based on a value of one of the marker elements of the plurality of marker elements, the selected marker element being one of the plurality of marker elements, the selected marker element being selected based on the address value, wherein the plurality of marker elements comprises a special marker element, the special marker element comprising a one bit store, the special marker element being configured to invert its value when enabled and to supply its stored value to an input of the selected marker element, and wherein at least one of the plurality of marker elements is configured to update the selected marker element to a new value based on a value stored by the special marker element.

9. The packet processor of claim 8, wherein the new value is different from a default value of the selected marker element.

10. The packet processor of claim 8, wherein the rule processor is configured to extract the marker element address value from a field of a processor rule.

11. The packet processor of claim 8, wherein one or more outputs of the plurality of marker elements is connected to the rule processor, the rule processor being configured to process the parsing rule in response to the one or more outputs.

12. The packet processor of claim 8, wherein the packet parser is configured to provide a packet transition signal at a beginning or end of a packet, and wherein one or more of the plurality of marker elements is configured to reset to a default value based on the packet transition signal.

13. The packet processor of claim 8, wherein the packet processor further comprises an address decoder configured to receive the result address value from the rule processor and to generate one of a plurality of enable signals, each of the plurality of enable signals being connected to a marker element as an enable input.

* * * * *